US012032360B2

(12) United States Patent
Li

(10) Patent No.: US 12,032,360 B2
(45) Date of Patent: Jul. 9, 2024

(54) METHOD, APPARATUS AND SYSTEM FOR PRESENTING SPRAYING OPERATION

(71) Applicant: GUANGZHOU XAIRCRAFT TECHNOLOGY CO., LTD., Guangdong (CN)

(72) Inventor: Jixiang Li, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 618 days.

(21) Appl. No.: 17/309,057

(22) PCT Filed: Oct. 10, 2019

(86) PCT No.: PCT/CN2019/110465
§ 371 (c)(1),
(2) Date: Apr. 16, 2021

(87) PCT Pub. No.: WO2020/078260
PCT Pub. Date: Apr. 23, 2020

(65) Prior Publication Data
US 2022/0035344 A1 Feb. 3, 2022

(30) Foreign Application Priority Data
Oct. 18, 2018 (CN) .......................... 201811217275.5

(51) Int. Cl.
G05B 19/416 (2006.01)
A01M 7/00 (2006.01)
G06T 11/40 (2006.01)

(52) U.S. Cl.
CPC ....... G05B 19/4166 (2013.01); A01M 7/0089 (2013.01); G06T 11/40 (2013.01); G05B 2219/45013 (2013.01)

(58) Field of Classification Search
CPC ..... G05B 19/4166; G05B 2219/45013; A01M 7/0089; G06T 11/40
(Continued)

(56) References Cited

U.S. PATENT DOCUMENTS

2012/0228395 A1* 9/2012 Needham .............. B05B 12/087
239/159
2017/0223947 A1 8/2017 Gall et al.
2018/0206475 A1 7/2018 Carter et al.

FOREIGN PATENT DOCUMENTS

CN 101226107 A 7/2008
CN 102841980 A 12/2012
(Continued)

OTHER PUBLICATIONS

International Search Report and Written Opinion for International application No. PCT/CN2019/110465, Jan. 6, 2020, ISA/CN.
(Continued)

Primary Examiner — Steven J Ganey
(74) Attorney, Agent, or Firm — ArentFox Schiff LLP

(57) ABSTRACT

Disclosed are a method, apparatus and system for presenting a spraying operation, wherein the method comprises: acquiring a spray coefficient of an operating device at an operation position corresponding to a sampling point, wherein the spray coefficient is used for representing a spray quantity of the operating device at the operation position (S102); acquiring color information corresponding to the spray coefficient of the operation position (S104); and presenting the operation position and the color information corresponding to the operation position (S106). The method solves the technical problems that a spray quantity at a specific position in a target region cannot be determined, and spray efficiency is low.

19 Claims, 8 Drawing Sheets

(58) Field of Classification Search
USPC .................................. 239/1, 67, 69, 159–172
See application file for complete search history.

(56) References Cited

FOREIGN PATENT DOCUMENTS

| | | |
|---|---|---|
| CN | 103803083 A | 5/2014 |
| CN | 105173085 A | 12/2015 |
| CN | 106503433 A | 3/2017 |
| CN | 106716288 A | 5/2017 |
| CN | 106996766 A | 8/2017 |
| CN | 107110754 A | 8/2017 |
| CN | 108040100 A | 5/2018 |
| CN | 108052562 A | 5/2018 |
| CN | 108594850 A | 9/2018 |
| CN | 109410288 A | 3/2019 |
| JP | 2003154999 A | 5/2003 |
| JP | 2008068710 A | 3/2008 |
| JP | 2014113864 A | 6/2014 |
| WO | 2017126308 A | 7/2017 |

OTHER PUBLICATIONS

First Office action for Foreign priority, Chinese patent application No. 201811217275.5, Apr. 16, 2020, 23 pages, Chinese Patent Office.
Second Office action for Foreign priority, Chinese patent application No. 201811217275.5, Jan. 13, 2021, 10 pages, Chinese Patent Office.
Office action dated Apr. 25, 2022 for corresponding Japanese patent application No. 2021-521041, Japanese Patent Office.
Office action dated Jul. 24, 2023 for corresponding Korean patent application No. 10-2021-7014070, Korean Patent Office.
Office action dated Jun. 3, 2021 for corresponding Chinese patent application No. 201811217275.5, Chinese Patent Office.
Office action dated Mar. 3, 2022 for corresponding Australian patent application No. 2019363108, Australian Patent Office.
Office action dated Apr. 27, 2022 for corresponding Canadian patent application No. 3115560, Canadian Patent Office.
Office action dated Dec. 7, 2021 for corresponding European patent application No. 19873170.5, European Patent Office.
Search report dated Nov. 11, 2021 for corresponding European patent application No. 19873170.5, European Patent Office.
Notice of Allowance dated Mar. 6, 2023 for corresponding Canadian patent application No. 3115560, Canadian Patent Office.
Intention to Grant dated Feb. 13, 2024 for corresponding European patent application No. 19873170.5, European Patent Office.
Decision to Grant dated Sep. 26, 2022 for corresponding Japanese patent application No. 2021-521041, Japanese Patent Office.
Decision to Grant dated Jan. 11, 2024 for corresponding Korean patent application No. 10-2021-7014070, Korean Patent Office.

\* cited by examiner

METHOD, APPARATUS AND SYSTEM FOR PRESENTING SPRAYING OPERATION

CROSS-REFERENCE TO RELATED APPLICATIONS

This application is a 371 U.S. national stage of PCT/CN2019/110465, filed Oct. 10, 2019, which claims priority to Chinese Patent Application No. 201811217275.5, filed Oct. 18, 2018, the contents of each of which are incorporated herein by reference in its entirety.

TECHNICAL FIELD

The present disclosure relates to the field of agriculture, and in particular to a method, apparatus and system for presenting (displaying) a spraying operation.

BACKGROUND ART

In the prior art, a farmer or a plant protector cannot determine the amount (or volume) of a chemical sprayed onto each sub-area of a target work area while applying the chemical to a crop by a plant protection device, which may easily cause excessive spraying of the chemical in some areas in the target work area, resulting in agrochemical residues and waste of agrochemicals, and which may cause insufficient or missed spraying of the chemical in some other areas, resulting in an unsatisfactory spraying effect and a failure in achieving the desired treatment effect.

SUMMARY OF THE INVENTION

The present disclosure provides a method, apparatus and system for presenting a spraying operation to solve at least the technical problem of low efficiency of spraying of the chemical caused by failing to determine a spray amount of the chemical applied to a specific location in a target area.

According to an aspect of the present disclosure, a method for presenting a spraying operation is provided. The method includes: acquiring a spray coefficient of an operating device at an operation location corresponding to a sampling point, where the spray coefficient is used for representing an amount of a chemical sprayed from the operating device at the operation location; acquiring color information corresponding to the operation location according to the spray coefficient; and presenting the operation location and the color information corresponding to the operation location.

Optionally, the acquisition of a spray coefficient of an operating device at an operation location corresponding to a sampling point includes: acquiring information on a spray flow rate from the operating device at the operation location and information on a moving speed of the operating device when passing through the operation location; and determining a spray coefficient based on the information on the spray flow rate and the information on the moving speed of the operating device, wherein the spray coefficient is directly proportional to the spray amount at the operation location.

Optionally, the acquisition of color information corresponding to the spray coefficient at the operation location includes: determining a value interval within which the spray coefficient at the operation location falls; determining color information corresponding to the value interval, and using the color information corresponding to the value interval as color information corresponding to the operation location.

Optionally, the presentation of the operation location and the color information corresponding to the operation location includes: presenting, in an electronic map, a moving trail of the operating device, the operation location in the moving trail, and the color information corresponding to the operation location; filing a moving trail between adjacent operation locations with gradient colors according to the color information corresponding to the adjacent operation locations, and presenting the moving trail which has been filled with the gradient colors.

Optionally, the presentation of the operation location and the color information corresponding to the operation location includes:
filling a moving trail of the operating device between adjacent operation locations with gradient colors according to the color information corresponding to the adjacent operation locations.

Optionally, before filling the moving trail between adjacent operation locations with gradient colors, the method further includes: judging whether the spray coefficients corresponding to the adjacent operation locations fall within the same value interval; and determining to trigger the filling of the moving trail between the adjacent operation locations with gradient colors when the judgment result is NO.

Optionally, the method further includes: determining to fill the moving trail between the adjacent operation locations with a specified color when the judgment result is YES, where the specified color is a color corresponding to any one of the adjacent operation locations.

Optionally, after presenting the operation location and the color information corresponding to the operation location, the method further includes: sending a control instruction to the operating device, where the control instruction is used for controlling the operating device to perform at least one of the following operations: controlling the operating device to supplementarily spray the chemical at the operation location corresponding to a first color when the color information is the first color; and controlling the operating device to spray water for diluting at the operation location corresponding to a second color when the color information is the second color.

Optionally, after presenting the operation location and the color information corresponding to the operation location, the method further includes:
sending a control instruction to the operating device, where the control instruction is used for controlling the operating device to perform at least one of the following operations:
controlling the operating device to supplementarily spray the chemical at an operation location with the spray coefficient lower than a first preset threshold; or
controlling the operating device to spray water for diluting at an operation location with the spray coefficient higher than a second preset threshold; where the second preset threshold is not less than the first preset threshold.

Optionally, before sending a control instruction to the operating device, the method further includes: acquiring a prescription map of a target area, where the prescription map is used for representing a target spray amount at each operation location in the target area; comparing the target spray amount with the spray amount corresponding to the spray coefficient; and determining the control instruction according to the comparison result.

Optionally, the acquisition of color information corresponding to the operation location according to the spray coefficient includes:

acquiring a target spray amount corresponding to the operation location;

calculating a difference degree value indicating the degree of a difference between the target spray amount and the spray coefficient at the operation location; and acquiring color information corresponding to the operation location according to the difference degree value.

Optionally, the acquisition of color information corresponding to the operation location according to the difference degree value includes:

determining a value interval within which the difference degree value falls;

determining color information corresponding to the value interval, and using the color information corresponding to the value interval as color information corresponding to the operation location.

Optionally, the acquisition of a target spray amount corresponding to the operation location includes:

acquiring a prescription map of a site to be sprayed, where the prescription map is used for indicating a target amount of spray onto each point or each area in the site to be sprayed; and determining a target spray amount corresponding to the operation location according to the correspondence relationship between the operation location and a point or area on the prescription map.

According to an aspect of the present disclosure, a method for presenting a spraying operation is provided. The method includes: acquiring a spray coefficient of an operating device at an operation location corresponding to a sampling point, where the spray coefficient is used for representing an amount of a chemical sprayed from the operating device at the operation location; acquiring an element corresponding to the spray coefficient at the operation location, where the element is an element in a presentation interface; determining information on a change trend between adjacent elements; and presenting the operation location, the element corresponding to the operation location, and the change trend information.

According to an aspect of the present disclosure, a method for presenting operation information is provided. The method includes: acquiring an operation coefficient of an operating device at an operation location corresponding to a sampling point, where the operation coefficient is used for representing an amount of operation performed by the operating device at the operation location; acquiring marking information corresponding to the operation coefficient at the operation location; and presenting the operation location and the marking information corresponding to the operation location.

Optionally, the operation coefficient includes at least one of: a chemical spraying operation coefficient and a coefficient for an operation of spreading of a solid object to be spread; and the marking information includes at least one of: three-dimensional height information, fringe density information, color information, and point set density information.

According to an aspect of the present disclosure, an apparatus for presenting a spraying operation is provided. The apparatus includes: an acquisition unit configured to: acquire a spray coefficient of an operating device at an operation location corresponding to a sampling point, where the spray coefficient is used for representing an amount of a chemical sprayed from the operating device at the operation location; and acquire color information corresponding to the spray coefficient at the operation location; and a presentation unit configured to present the operation location and the color information corresponding to the operation location.

According to an aspect of the present disclosure, a system for presenting a spraying operation is provided. The system includes: an operating device configured to collect a spray coefficient of the operating device at an operation location corresponding to a sampling point and send the spray coefficient to a terminal, where the spray coefficient is used for representing an amount of a chemical sprayed from the operating device at the operation location; and the terminal configured to receive the spray coefficient, acquire color information corresponding to the spray coefficient at the operation location, and present the operation location and the color information corresponding to the operation location.

According to an aspect of the present disclosure, a storage medium is provided. The storage medium includes a program stored therein, wherein when the program is running, a device where the storage medium is located is controlled to execute the method for presenting a spraying operation described above, or the method for presenting operation information described above.

According to an aspect of the present disclosure, a processor is provided. The processor is configured to run a program, wherein the program is run to execute the method for presenting a spraying operation described above, or the method for presenting operation information described above.

In an embodiment of the present disclosure, a spray coefficient of an operating device at an operation location corresponding to a sampling point is acquired, where the spray coefficient is used for representing an amount of a chemical sprayed from the operating device at the operation location; color information corresponding to the spray coefficient at the operation location is acquired; and the operation location and the color information corresponding to the operation location are presented. This allows the visualization of spraying of a chemical from the operating device during the operation, which enables the operator to intuitively determine the status of spray from the operating device during the operation. A place where is excessively sprayed, insufficiently sprayed, or not sprayed is intuitively visible by presenting the operation location and the color information corresponding to the operation location. In the case of excessive spraying, a dilution treatment can be performed in time to reduce agrochemical residues in a crop. In the case of missed spraying or insufficient spraying, the pilot can immediately re-plan a flight route for supplementary spray. This ensures the uniform spraying of agrochemicals on crops and the reasonable utilization of agrochemicals to increase the efficiency of spraying of agrochemicals and guarantee a good harvest for farmers, thereby solving the technical problem of low efficiency of spraying of the chemical caused by failing to determine a spray amount of the chemical applied to a specific position in a target area.

BRIEF DESCRIPTION OF THE DRAWINGS

The drawings described herein are intended to provide a further understanding of the present disclosure and constitute a part of the present disclosure. Exemplary embodiments of the present disclosure and descriptions thereof are intended to explain the present disclosure and are not intended to improperly limit the present disclosure. In the figures.

DETAILED DESCRIPTION OF THE EMBODIMENTS

The technical solutions of the embodiments of the present disclosure will be described below clearly and completely with reference to the drawings of the embodiments of the present disclosure, in order to enable those skilled in the art to better understand the solutions of the present disclosure. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

It should be noted that the terms such as "first" and "second" in the specification, the claims, and the above accompanying drawings of the present disclosure are intended to distinguish between similar objects but do not necessarily indicate a specific order or sequence. It should be understood that data used in this way are interchangeable in a proper circumstance, so that the embodiments of the present disclosure described herein can be implemented in other orders than those illustrated or described herein. In addition, the terms "including", "comprising", "having", and any variants thereof are intended to cover non-exclusive inclusions. For example, a process, method, system, product, or device that includes a list of steps or units is not necessarily limited to those steps or units expressly listed, but may include other steps or units not expressly listed or inherent to such a process, method, product, or device.

Figure 1:
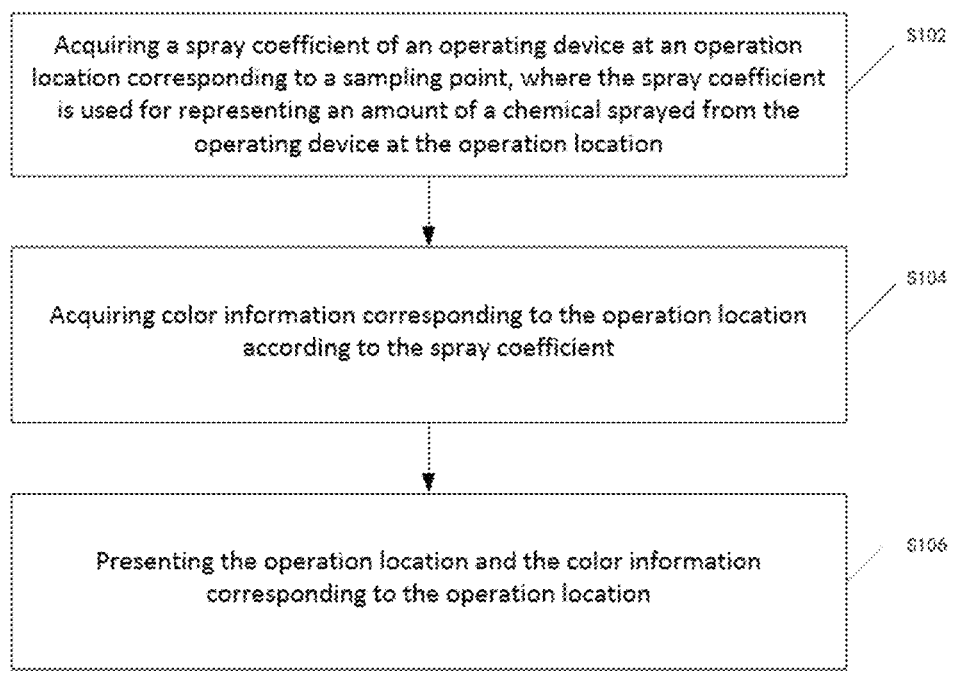
FIG. 1 is a schematic flowchart of a method for presenting a spraying operation according to an embodiment of the present disclosure.

FIG. 1 is a schematic flowchart of a method for presenting a spraying operation according to an embodiment. As shown in FIG. 1, the method includes at least the following steps S102 to S106.

In step S102, a spray coefficient of an operating device at an operation location corresponding to a sampling point is acquired, where the spray coefficient is used for representing an amount of a chemical sprayed from the operating device at the operation location. Optionally, in this embodiment, the operating device may be a plant protection device (such as a drone or an unmanned aerial vehicle for plant protection) for spraying a chemical onto a target site. The operating device may communicate with a terminal device. The terminal may be a remote controller of the operating device (such as a remote controller of a drone), or the terminal may be a smart phone, a tablet computer, or other electronic device.

In this embodiment, the spray coefficient of the operating device at the operation location corresponding to the sampling point may be acquired by the terminal. The above-mentioned sampling point is a time period in which the spray coefficient is acquired during the operation of the operating device. The spray coefficient includes, but not limited to, the ratio of the spray flow rate to the moving speed of the operating device; where the spray flow rate is a flow rate of an agricultural chemical sprayed. A greater spray coefficient indicates a greater amount or volume of spray from the operating device at the operation location.

In step S104, color information corresponding to the operation location is acquired according to the spray coefficient.

Optionally, in this embodiment, the correspondence relationship between the spray coefficient and the color information may be stored in advance. Different spray coefficients may correspond to different colors, or may correspond to different shades of the same color and may be, for example, expressed by the brightness of a color.

In step S106, the operation location and the color information corresponding to the operation location are presented.

Optionally, in this embodiment, the color information corresponding to each operation location may be presented to the user via the terminal. The above-mentioned operation location is a location where the operating device performs the spraying operation. The color information is related to the spray coefficient. The spray coefficient is related to the spray amount (the amount of the chemical sprayed). The presentation of the operation location and the color information corresponding to the operation location is equivalent to the presentation of the operation location and information on the spray amount at the operation location.

The spray coefficient of the operating device at the operation location corresponding to the sampling point may be acquired by: acquiring information on a spray flow rate from the operating device at the operation location and information on a moving speed of the operating device when passing through the operation location; and determining a spray coefficient based on the information on the spray flow rate and the information on the moving speed of the operating device, wherein the spray coefficient is directly proportional to the spray amount at the operation location.

The color information corresponding to the operation location may be acquired by: determining a value interval (or range) within which the spray coefficient at the operation location falls; determining color information corresponding to the value interval, and using the color information corresponding to the value interval as color information corresponding to the operation location.

Optionally, in this embodiment, the correspondence relationship between the spray coefficient and the color information should be preset after a value interval within which the spray coefficient falls is determined and before color information corresponding to the value interval is determined. The spray coefficient may be set between 0 and 9. When the spray coefficient is 0, the corresponding color information is set to white. When the spray coefficient is 1 to 7, the corresponding color information is set to yellow. When the spray coefficient is 9, the corresponding color information is set to red.

The operation location and the color information corresponding to the operation location may be presented in the following ways.

In an example, the operation location may be a point in a moving trail. A moving trail of the operating device between adjacent operation locations may be filled with gradient colors according to the color information corresponding to the adjacent operation locations.

Figure 2:
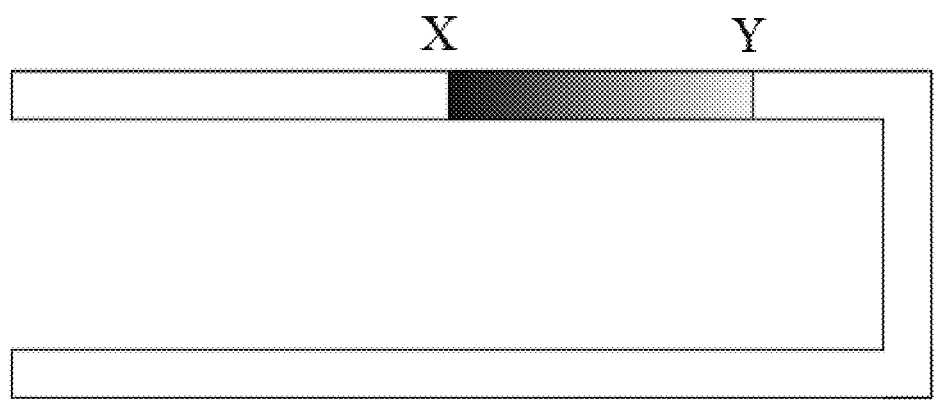
FIG. 2 is an example of filling a trail with color according to an embodiment of the present disclosure.

For example, in FIG. 2, point X is an operation location in the moving trail of the operating device, and point Y is an operation location adjacent to point X. If the point X corresponds to a spray coefficient of 9, the color corresponding to the point X is red. If the point Y corresponds to a spray coefficient of 5, the color corresponding to the point Y is yellow. Then, the moving trail between the point X and the point Y is displayed as gradient colors from red to yellow.

In another example, the operation location may be a region in a moving trail. A moving trail of the operating device, operation locations in the moving trail, and color information corresponding to the operation locations may be presented in an electronic map. In this way, multiple operation regions can be connected so that the entire moving trail exhibits colors that can reflect the spray coefficients.

Further, if there is a gap between the regions corresponding to the operation locations, a moving trail between the adjacent operation locations may be filled with gradient colors according to the color information corresponding to the adjacent operation locations, and the moving trail which has been filled with the gradient colors is presented.

Figure 3A:
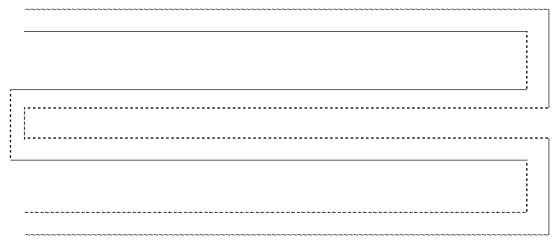
FIG. 3A is a diagram of a moving trail of an operating device.
Figure 3B:
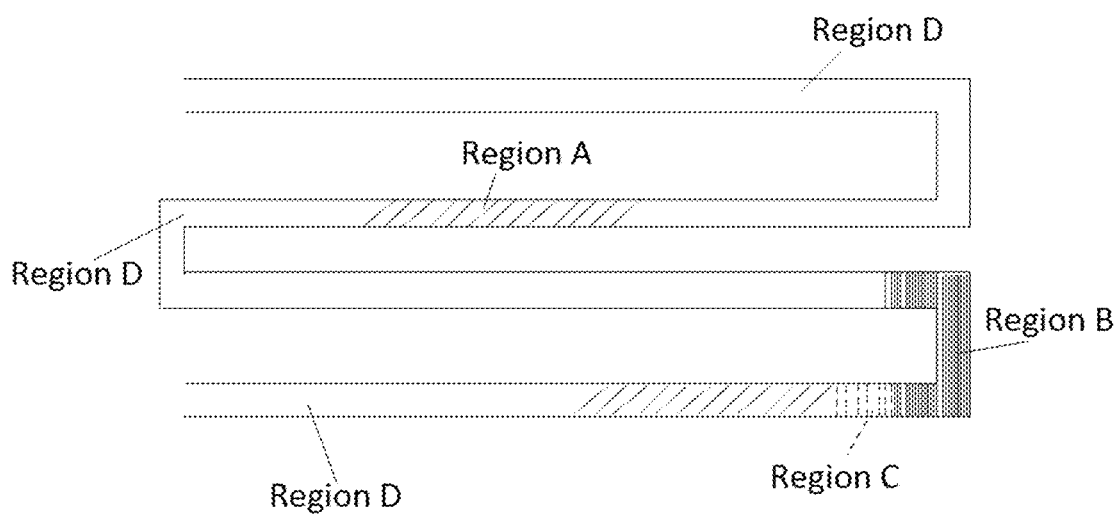
FIG. 3B is another example of filling a trail with color according to an embodiment of the present disclosure.

For example, FIG. 3A shows a moving trail of the operating device, and FIG. 3B shows operation locations of the operating device in the moving trail, and color information corresponding to the operation locations. Here, in FIG. 3B, region A is a region with an insufficient spray amount, which is expressed with a color A1, region B is a region with an excessive spray amount, which is expressed with a color B1, region C corresponds to gradient colors, and region D is a blank region in the trail of FIG. 3B and is a region with the required spray amount, which may be expressed with a color D1.

Optionally, steps of judging whether the spray coefficients corresponding to the adjacent operation locations fall within the same value interval, and determining to trigger the filling of the moving trail between the adjacent operation locations with gradient colors when the judgment result is NO may be further performed before filling the moving trail between the adjacent operation locations with gradient colors. When the judgment result is YES, it is determined to fill the moving trail between the adjacent operation locations with a specified color, where the specified color is a color corresponding to any one of the adjacent operation locations.

Optionally, the spray coefficient is set in a range of 0 to 9 and set within different value intervals. For example, the spray coefficients are divided into three intervals, namely, a first interval between 0 and 3, a second interval between 4 and 7, and a third interval between 8 and 9. Moreover, the first interval is set to correspond to a red color, the second interval is set to correspond to a green color, and the third interval is set to correspond to a blue color. Before filling a moving trail between adjacent operation locations with gradient colors, when it is judged that the spray coefficients corresponding to the adjacent operation locations do not fall within the same value interval, for example, when a first operation location and a second operation location adjacent to each other correspond to spray coefficients of 3 and 4, respectively, it is determined to trigger the filling of the moving trail between the adjacent operation locations with gradient colors between red and green. When both the first operation location and the second operation location adjacent to each other correspond to a spray coefficient of 4, it is determined to fill the moving trail between the adjacent operation locations with green.

The following step may be further performed after the operation location and the color information corresponding to the operation location are presented.

In step S1062, a control instruction is sent to the operating device, where the control instruction is used for controlling the operating device to perform at least one of the following operations:

controlling the operating device to supplementarily spray the chemical at an operation location(s) with the spray coefficient lower than a first preset threshold; and controlling the operating device to spray water for diluting at an operation location(s) with the spray coefficient higher than a second preset threshold; where the second preset threshold is not less than the first preset threshold.

In other words, in this embodiment, when the color information at the operation location is a first color, the operating device may be controlled to supplementarily spray the chemical at the operation location corresponding to the first color. Alternatively, when the color information at the operation location is a second color, the operating device is controlled to spray water for diluting at the operation location corresponding to the second color.

Optionally, a first spray coefficient corresponding to the first color described above is smaller than a second spray coefficient corresponding to the second color. Here, the first spray coefficient corresponds to an insufficient amount of the chemical sprayed, and the second spray coefficient corresponds to an excessive amount of the chemical sprayed.

Optionally, before sending a control instruction to the operating device, the method may further include the following steps:

step S10602 of acquiring a prescription map of a target area, where the prescription map is used for indicating a target spray amount at each operation location in the target area;

step S10604 of comparing the target spray amount with the spray amount corresponding to the spray coefficient; and step S10606 of determining the control instruction according to the comparison result.

Optionally, the control instruction is determined according to the comparison result so as to: supplementarily spray the chemical when the target spray amount is greater than the spray amount corresponding to the spray coefficient; and spray a dilution when the target spray amount is less than the spray amount corresponding to the spray coefficient.

In addition, the overall spraying status can be used for analyzing the total amount of a chemical sprayed onto the entire plot of land. If the entire plot of land is determined to be excessively sprayed according to the overall spray amount and the partial spray amount on a plant, the plant may be recorded as a non-green product with excessive agrochemicals.

In this embodiment, a spray coefficient of an operating device at an operation location corresponding to a sampling point is acquired, where the spray coefficient is used for representing an amount of a chemical sprayed from the operating device at the operation location; color information corresponding to the spray coefficient at the operation location is acquired; and the operation location and the color information corresponding to the operation location are presented. This allows the visualization of spraying of a chemical from the operating device during the operation, which enables the operator to intuitively determine the status of spray from the operating device during the operation. A place where is excessively sprayed, insufficiently sprayed, or not sprayed is intuitively visible by presenting the operation location and the color information corresponding to the operation location. In the case of excessive spraying, a dilution treatment can be performed in time to reduce agrochemical residues in a crop. In the case of missed spraying or insufficient spraying, the pilot can immediately re-plan a flight route for supplementary spray. This ensures the uniform spraying of agrochemicals on crops and the reasonable utilization of agrochemicals to increase the efficiency of spraying of agrochemicals and guarantee a good harvest for farmers, thereby solving the technical problem of low efficiency of spraying of the chemical caused by failing to determine a spray amount of the chemical applied to a specific position in a target area.

Optionally, in this embodiment, in the step S104, it is also possible to acquire a target spray amount corresponding to the operation location, and then calculate a difference degree value indicating the degree of a difference between the target spray amount and the spray coefficient at the operation location and acquire color information corresponding to the operation location according to the difference degree value. In this way, color information corresponding to an operation location is related to a difference degree value indicating the degree of a difference between the target spray amount and the spray coefficient corresponding to the operation location, so that it is convenient for the user to intuitively know whether the actual spray amount at the operation location reaches the desired spray amount. Optionally, the acquisition of a target spray amount corresponding to the operation location may include: acquiring a prescription map of a site to be sprayed, the prescription map being used for indicating a target amount of spray onto each point or each area in the site to be sprayed; and determining a target spray amount corresponding to the operation location according to the correspondence relationship between the operation location and a point or area on the prescription map.

Figure 4:
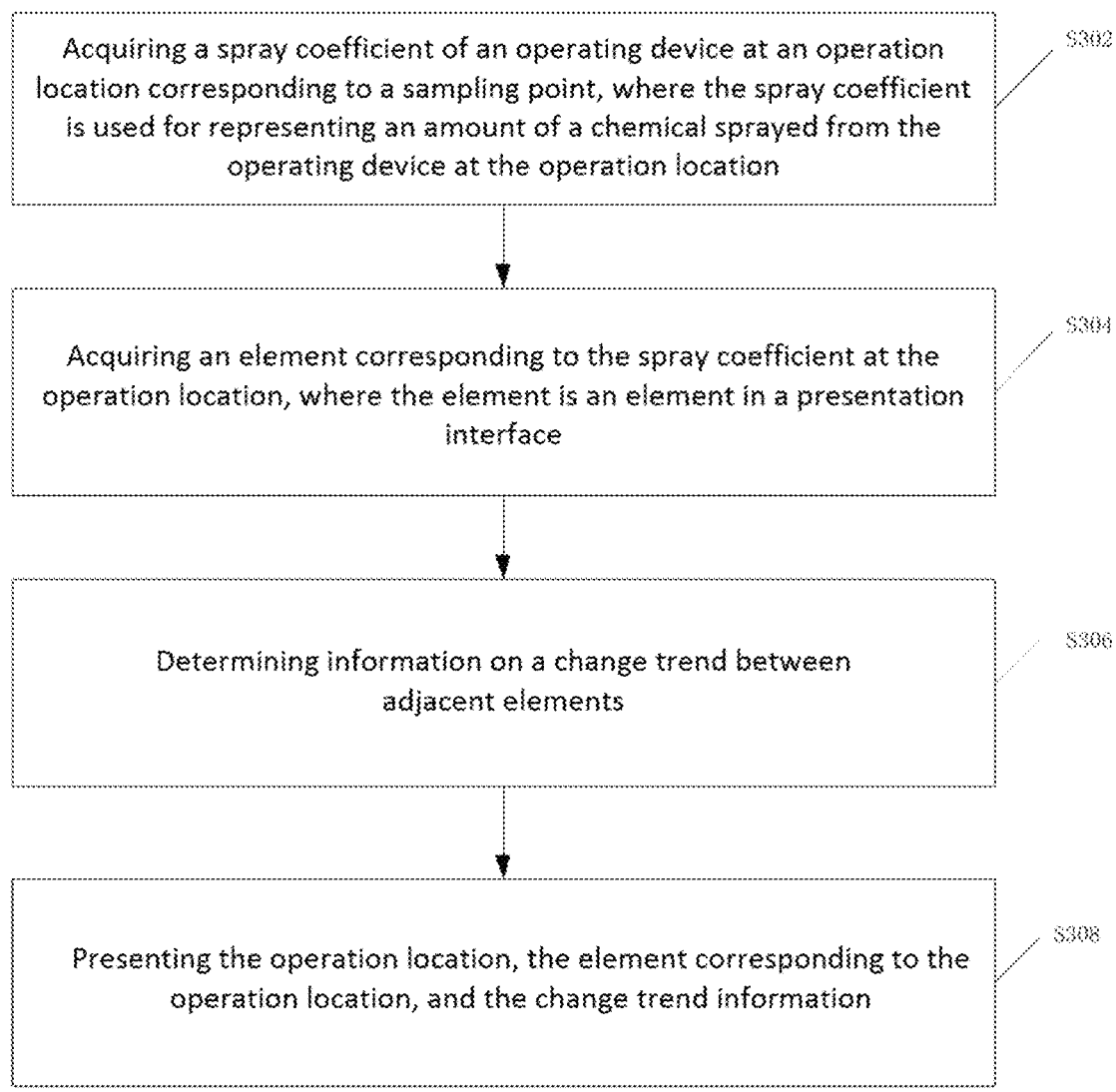
FIG. 4 is a schematic flowchart of another method for presenting a spraying operation according to an embodiment of the present disclosure.

FIG. 4 is a schematic flowchart of another method for presenting a spraying operation according to an embodiment. As shown in FIG. 4, the method includes at least the following steps S302 to S308.

In step S302, a spray coefficient of an operating device at an operation location corresponding to a sampling point is acquired, where the spray coefficient is used for representing an amount of a chemical sprayed from the operating device at the operation location.

In an optional embodiment, the above-mentioned sampling point is a time period in which the spray coefficient is acquired during the operation of the operating device. The spray coefficient is the ratio of the spray flow rate to the moving speed of the operating device; where the spray flow rate is a flow rate of an agricultural chemical sprayed. A greater spray coefficient indicates a greater amount of spray from the operating device at the operation location.

In step S304, an element corresponding to the operation location is acquired according to the spray coefficient, where the element is an element in a presentation interface.

Optionally, the above-mentioned element may include at least one of the following information: graphic information, color information, and graphic density information.

Optionally, the above-mentioned element is color information. The correspondence relationship between the spray coefficient and the color information may be stored in advance. Different spray coefficients may correspond to different colors, or may correspond to different shades of the same color and may be, for example, expressed by the brightness of a color.

Optionally, the above-mentioned element is also information representing the degree of a difference between the target spray amount and the spray coefficient at the operation location.

In step S306, information on a change trend between adjacent elements is determined.

Optionally, in this embodiment, the information on a change trend between adjacent elements may be information on a color change trend, a graphic change trend, or a change in graphic density.

In step S308, the operation location, the element corresponding to the operation location, and the change trend information are presented.

Optionally, when the element is color information, the above-mentioned operation location is a location where the operating device performs an operation. The color information is related to the spray coefficient. The spray coefficient is related to the spray amount. The presentation of the operation location, the color information corresponding to the operation location, and the trend of change in the color information is equivalent to the presentation of the operation location and information on the spray amount at the operation location.

The spray coefficient of the operating device at the operation location corresponding to the sampling point may be acquired by: acquiring information on a spray flow rate from the operating device at the operation location and information on a moving speed of the operating device when passing through the operation location; and determining a spray coefficient based on the information on the spray flow rate and the information on the moving speed of the operating device, wherein the spray coefficient is directly proportional to the spray amount at the operation location.

The color information corresponding to the spray coefficient at the operation location may be acquired by: determining a value interval within which the spray coefficient falls; determining color information corresponding to the value interval, and using the color information corresponding to the value interval as color information corresponding to the spray coefficient.

Optionally, the correspondence relationship between the spray coefficient and the color information should be preset after a value interval within which the spray coefficient falls is determined and before color information corresponding to the value interval is determined. The spray coefficient may be set between 0 and 9. When the spray coefficient is 0, the corresponding color information is set to white. When the spray coefficient is 1 to 7, the corresponding color information is set to yellow. When the spray coefficient is 9, the corresponding color information is set to red.

The operation location and the color information corresponding to the operation location may be presented by: presenting, in an electronic map, a moving trail of the operation device, operation locations in the moving trail, and the color information corresponding to the operation locations; filling the moving trail between adjacent operation locations with gradient colors and presenting the moving trail which has been filled with the gradient colors. In other words, in this embodiment, a moving trail of the operating device between adjacent operation locations may be filled with gradient colors according to the color information corresponding to the adjacent operation locations.

Optionally, steps of judging whether the spray coefficients corresponding to the adjacent operation locations fall within the same value interval, and determining to trigger the filling of the moving trail between the adjacent operation locations with gradient colors when the judgment result is NO may be further performed before filling the moving trail between the adjacent operation locations with gradient colors. When the judgment result is YES, it is determined to fill the moving trail between the adjacent operation locations with a specified color, where the specified color is a color corresponding to any one of the adjacent operation locations.

Optionally, the spray coefficient is set in a range of 0 to 9 and set within different value intervals. For example, the spray coefficients are divided into three intervals, namely, a first interval between 0 and 3, a second interval between 4 and 7, and a third interval between 8 and 9. Moreover, the first interval is set to correspond to a red color, the second interval is set to correspond to a green color, and the third interval is set to correspond to a blue color. Before filling a moving trail between adjacent operation locations with gradient colors, when it is judged that the spray coefficients corresponding to the adjacent operation locations do not fall within the same value interval, for example, when a first operation location and a second operation location adjacent to each other correspond to spray coefficients of 3 and 4, respectively, it is determined to trigger the filling of the moving trail between the adjacent operation locations with gradient colors between red and green. When both the first operation location and the second operation location adjacent to each other correspond to a spray coefficient of 4, it is determined to fill the moving trail between the adjacent operation locations with green.

The following step may be further performed after the operation location and the color information corresponding to the operation location are presented.

In step S3062, a control instruction is sent to the operating device, where the control instruction is used for controlling the operating device to perform at least one of the following operations: controlling the operating device to supplementarily spray the chemical at an operation location(s) with the spray coefficient lower than a first preset threshold; or controlling the operating device to spray water for diluting at an operation location(s) with the spray coefficient higher than a second preset threshold; where the second preset threshold is not less than the first preset threshold.

In other words, when the color information at the operation location is a first color, the operating device may be controlled to supplementarily spray the chemical at the operation location corresponding to the first color. When the color information at the operation location is a second color, the operating device is controlled to spray water for diluting at the operation location corresponding to the second color.

Optionally, a first spray coefficient corresponding to the first color described above is smaller than a second spray coefficient corresponding to the second color. Here, the first spray coefficient corresponds to an insufficient amount of the chemical sprayed, and the second spray coefficient corresponds to an excessive amount of the chemical sprayed.

Optionally, before sending a control instruction to the operating device, the method may further include the following steps:

step S30602 of acquiring a prescription map of a target area, where the prescription map is used for indicating a target spray amount at each operation location in the target area;

step S30604 of comparing the target spray amount with the spray amount corresponding to the spray coefficient; and step S30606 of determining the control instruction according to the comparison result.

Optionally, the control instruction is determined according to the comparison result so as to: supplementarily spray the chemical when the target spray amount is greater than the spray amount corresponding to the spray coefficient; and spray a dilution when the target spray amount is less than the spray amount corresponding to the spray coefficient.

In addition, the overall spraying status can be used for analyzing the total amount of a chemical sprayed onto the entire plot of land. If the entire plot of land is determined to be excessively sprayed according to the overall spray amount and the partial spray amount on a plant, the plant may be recorded as a non-green product with excessive agrochemicals.

In this embodiment, a spray coefficient of an operating device at an operation location corresponding to a sampling point is acquired, where the spray coefficient is used for representing an amount of a chemical sprayed from the operating device at the operation location; an element corresponding to the spray coefficient at the operation location is acquired, where the element is an element in a presentation interface; information on a change trend between adjacent elements is determined; and the operation location, the element corresponding to the operation location, and the change trend information are presented. This allows the visualization of spraying of a chemical from the operating device during the operation, which enables the operator to intuitively determine the status of spray from the operating device during the operation. A place where is excessively sprayed, insufficiently sprayed, or not sprayed is intuitively visible by presenting the operation location and the color information corresponding to the operation location. In the case of excessive spraying, a dilution treatment can be performed in time to reduce agrochemical residues in a crop. In the case of missed spraying or insufficient spraying, the pilot can immediately re-plan a flight route for supplementary spray. This ensures the uniform spraying of agrochemicals on crops and the reasonable utilization of agrochemicals to increase the efficiency of spraying of agrochemicals and guarantee a good harvest for farmers, thereby solving the technical problem of low efficiency of spraying of the chemical caused by failing to determine a spray amount of the chemical applied to a specific position in a target area.

Figure 5:
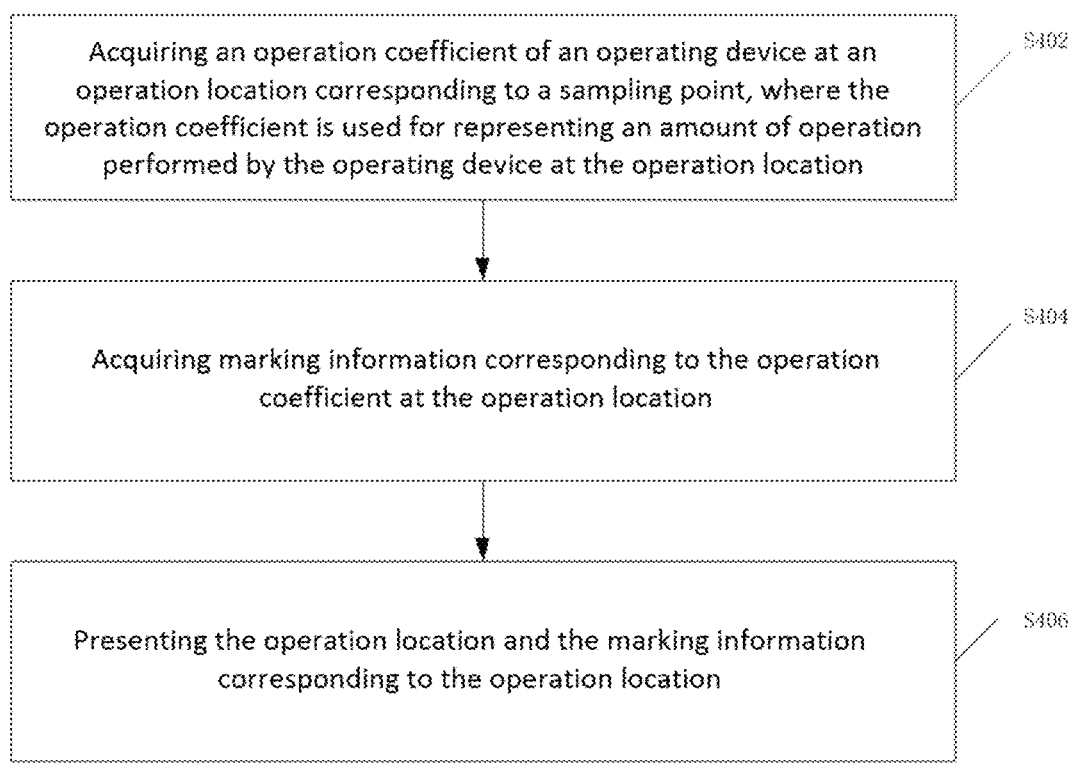
FIG. 5 is a schematic flowchart of a method for presenting operation information according to an embodiment of the present disclosure.

FIG. 5 is a schematic flowchart of a method for presenting operation information according to an embodiment. As shown in FIG. 5, the method includes at least the following steps.

In step S402, an operation coefficient of an operating device at an operation location corresponding to a sampling point is acquired, where the operation coefficient is used for representing an amount of operation performed by the operating device at the operation location.

Optionally, the operation coefficient includes at least one of: a chemical spraying operation coefficient and a coefficient for an operation of spreading of a solid object to be spread.

Optionally, when the above-mentioned operation coefficient is a chemical spraying operation coefficient, the above-mentioned sampling point is a period in which the chemical spraying operation coefficient is acquired during the operation of the operating device. The chemical spraying operation coefficient is the ratio of the spray flow rate to the moving speed, wherein the spray flow rate is a flow rate of an agricultural chemical sprayed. A greater chemical spraying operation coefficient indicates a greater amount of the chemical sprayed from the operating device at the operation location.

In step S404, marking information corresponding to the operation location is acquired according to the operation coefficient.

The marking information includes at least one of: three-dimensional height information, fringe density information, color information, and point set density information.

Optionally, when the operation coefficient is a chemical spraying operation coefficient and when the marking information is color information, the correspondence relationship between the chemical spraying operation coefficient and the color information may be stored in advance. Different chemical spraying operation coefficients may correspond to different colors, or may correspond to different shades of the same color.

Optionally, the above-mentioned color information also represents the degree of a difference between the target spray amount and the spray coefficient at the operation location. In step S406, the operation location and the marking information corresponding to the operation location are presented.

Optionally, the above-mentioned operation location is a location where the operating device performs an operation. The marking information is related to the operation coefficient. The operation coefficient is related to the amount of operation. The presentation of the operation location and the marking information corresponding to the operation location is equivalent to the presentation of the operation location and information on the amount of operation performed at the operation location.

Optionally, when the above-mentioned operation coefficient is a chemical spraying operation coefficient, the chemical spraying operation coefficient of the operating device at the operation location corresponding to the sampling point may be acquired by: acquiring information on a spray flow rate from the operating device at the operation location and information on a moving speed of the operating device when passing through the operation location; and determining a chemical spraying operation coefficient based on the information on the spray flow rate and the information on the moving speed of the operating device, wherein the chemical spraying operation coefficient is directly proportional to the amount of the chemical sprayed at the operation location.

When the above-mentioned marking information is color information, the color information corresponding to the chemical spraying operation coefficient at the operation location may be determined and acquired by: determining a value interval within which the chemical spraying operation coefficient falls; determining color information corresponding to the value interval, and using the color information corresponding to the value interval as color information corresponding to the chemical spraying operation coefficient.

Optionally, the correspondence relationship between the chemical spraying operation coefficient and the color information should be preset after a value interval within which the chemical spraying operation coefficient falls is determined and before color information corresponding to the value interval is determined. The chemical spraying operation coefficient may be set between 0 and 9. When the chemical spraying operation coefficient is 0, the corresponding color information is set to white. When the chemical spraying operation coefficient is 1 to 7, the corresponding color information is set to yellow. When the chemical spraying operation coefficient is 9, the corresponding color information is set to red.

The operation location and the color information corresponding to the operation location may be presented in the following ways.

In an example, the operation location may be a point in a moving trail. A moving trail of the operating device between adjacent operation locations may be filled with gradient colors according to the color information corresponding to the adjacent operation locations.

In another example, the operation location may be a region in a moving trail. A moving trail of the operating device, operation locations in the moving trail, and color information corresponding to the operation locations may be presented in an electronic map. Further, if there is a gap between the regions corresponding to the operation locations, a moving trail between the adjacent operation locations may be filled with gradient colors according to the color information corresponding to the adjacent operation locations, and the moving trail which has been filled with the gradient colors is presented.

Optionally, steps of judging whether the chemical spraying operation coefficients corresponding to the adjacent operation locations fall within the same value interval, and determining to trigger the filling of the moving trail between the adjacent operation locations with gradient colors when the judgment result is NO may be further performed before filling the moving trail between the adjacent operation locations with gradient colors. When the judgment result is YES, it is determined to fill the moving trail between the adjacent operation locations with a specified color, where the specified color is a color corresponding to any one of the adjacent operation locations.

Optionally, the chemical spraying operation coefficient is set in a range of 0 to 9 and set within different value intervals. For example, the chemical spraying operation coefficients are divided into three intervals, namely, a first interval between 0 and 3, a second interval between 4 and 7, and a third interval between 8 and 9. Moreover, the first interval is set to correspond to a red color, the second interval is set to correspond to a green color, and the third interval is set to correspond to a blue color. Before filling a moving trail between adjacent operation locations with gradient colors, when it is judged that the chemical spraying operation coefficients corresponding to the adjacent operation locations do not fall within the same value interval, for example, when a first operation location and a second operation location adjacent to each other correspond to chemical spraying operation coefficients of 3 and 4, respectively, it is determined to trigger the filling of the moving trail between the adjacent operation locations with gradient colors between red and green. When both the first operation location and the second operation location adjacent to each other correspond to a chemical spraying operation coefficient of 4, it is determined to fill the moving trail between the adjacent operation locations with green.

The following step may be further performed after the operation location and the color information corresponding to the operation location are presented.

In step S4062, a control instruction is sent to the operating device, where the control instruction is used for controlling the operating device to perform at least one of the following operations: controlling the operating device to supplementarily spray the chemical at an operation location(s) with the chemical spraying operation coefficient lower than a first preset threshold; or controlling the operating device to spray water for diluting at an operation location(s) with the chemical spraying operation coefficient higher than a second preset threshold; where the second preset threshold is not less than the first preset threshold.

In other words, when the color information at the operation location is a first color, the operating device may be controlled to supplementarily spray the chemical at the operation location corresponding to the first color. When the color information at the operation location is a second color, the operating device is controlled to spray water for diluting at the operation location corresponding to the second color.

Optionally, a first chemical spraying operation coefficient corresponding to the first color described above is smaller than a second chemical spraying operation coefficient corresponding to the second color. Here, the first chemical spraying operation coefficient corresponds to an insufficient amount of the chemical sprayed, and the second chemical spraying operation coefficient corresponds to an excessive amount of the chemical sprayed.

Optionally, before sending a control instruction to the operating device, the method may further include the following steps:

step S40602 of acquiring a prescription map of a target area, where the prescription map is used for indicating a target spray amount at each operation location in the target area;

step S40604 of comparing the target spray amount with the spray amount corresponding to the chemical spraying operation coefficient; and step S40606 of determining the control instruction according to the comparison result.

Optionally, the control instruction is determined according to the comparison result so as to: supplementarily spray the chemical when the target spray amount is greater than the spray amount corresponding to the chemical spraying operation coefficient; and spray a dilution when the target spray amount is less than the spray amount corresponding to the chemical spraying operation coefficient.

In this embodiment, an operation coefficient of an operating device at an operation location corresponding to a sampling point is acquired, where the operation coefficient is used for representing an amount of operation performed by the operating device at the operation location; marking information corresponding to the operation coefficient at the operation location is acquired; and the operation location and the marking information corresponding to the operation location are presented. This enables a control device to receive specified chemical information collected by a server and determine operation parameters for the operating device according to the chemical information, so that the control device can control loading of the operating device with a chemical and an operation of the operating device. In this way, less time and manual effort are consumed during use of a drone, and the working efficiency of the drone is increased, thereby solving the technical problem of low efficiency of spraying of the chemical caused by failing to determine a spray amount of the chemical applied to a specific position in a target area.

Figure 6:
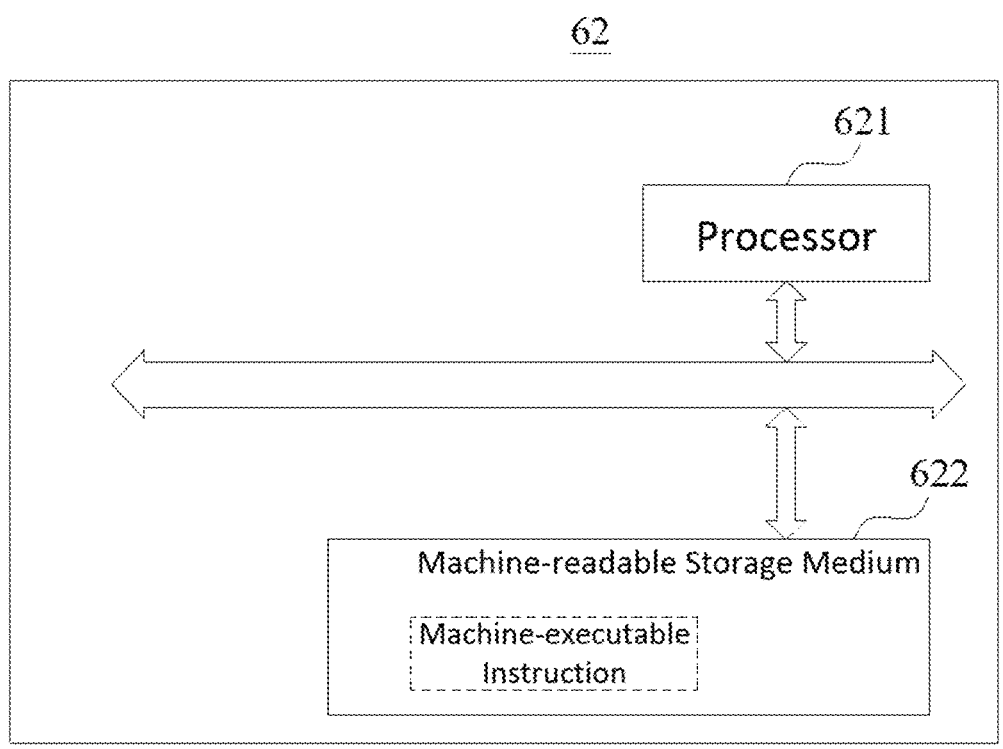
FIG. 6 is a schematic structural diagram of a terminal according to an embodiment of the present disclosure.

Referring to FIG. 6, FIG. 6 is a schematic diagram of a hardware structure of a terminal 64 according to an embodiment. The terminal 64 may include a processor 641 and a machine-readable storage medium 642. The processor 641 may communicate with the machine-readable storage medium 642 via a system bus. Moreover, machine-executable instructions are stored in the machine-readable storage medium 642. The processor 641 may execute the method for presenting a spraying operation described above, by reading and executing the machine-executable instructions corresponding to the operation parameter configuration logic that are stored in the machine-readable storage medium 642.

The machine-readable storage medium 642 mentioned herein may be any electronic, magnetic, optical, or other physical storage device, and may contain or store information such as executable instructions, data, and so on. For example, the machine-readable storage medium may be: a RAM (random access memory), a volatile memory, a non-volatile memory, a flash memory, a storage drive (e.g., a hard drive), a solid state drive, any type of storage disk (e.g., an optical disk, DVD, or the like), or a similar storage medium, or a combination thereof.

Figure 7:
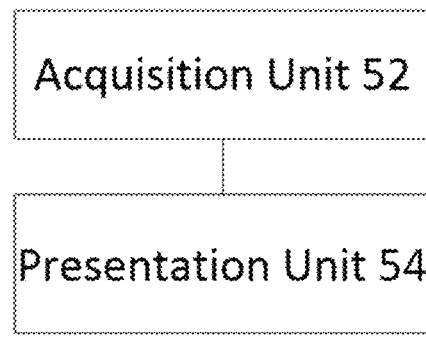
FIG. 7 is a schematic diagram of functional modules of an apparatus for presenting a spraying operation according to an embodiment of the present disclosure.

FIG. 7 is a schematic structural diagram of an apparatus for presenting a spraying operation according to an embodiment. The apparatus for presenting a spraying operation may include at least one functional module that can be stored in the machine-readable storage medium 642 in the form of software. When divided by function, the apparatus for presenting a spraying operation may include an acquisition unit 52 and a presentation unit 54.

The acquisition unit 52 is configured to: acquire a spray coefficient of an operating device at an operation location corresponding to a sampling point, where the spray coefficient is used for representing an amount of a chemical sprayed from the operating device at the operation location; and acquire color information corresponding to the operation location according to the spray coefficient.

In this embodiment, the acquisition unit 52 may be configured to perform the steps S102 and S104 shown in FIG. 1. A specific description of the acquisition unit 52 may be understood with reference to the description of the steps S102 and S104. The presentation unit 54 is configured to present the operation location and the color information corresponding to the operation location.

In this embodiment, the presentation unit 54 may be configured to perform the step S106 shown in FIG. 1. A specific description of the presentation unit 54 may be understood with reference to the description of the step S106.

Figure 8:
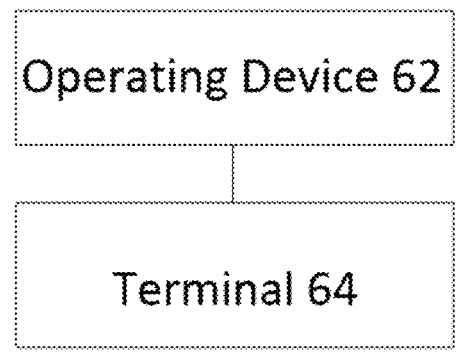
FIG. 8 is a schematic structural diagram of a system for presenting a spraying operation according to an embodiment of the present disclosure.

FIG. 8 is a schematic structural diagram of a system for presenting a spraying operation according to an embodiment.

The operating device 62 is configured to collect a spray coefficient of the operating device at an operation location corresponding to a sampling point and send the spray coefficient to a terminal, where the spray coefficient is used for representing an amount of a chemical sprayed from the operating device at the operation location.

The terminal 64 is configured to receive the spray coefficient, acquire color information corresponding to the operation location according to the spray coefficient, and present the operation location and the color information corresponding to the operation location.

It should be noted that the specific operational mode of the system for presenting a spraying operation may be understood with reference to the related description of the steps shown in FIG. 1 and therefore will not be described in detail here.

The serial numbers of the embodiments are merely intended for description and do not represent the advantages and disadvantages of the embodiments.

It should be understood that the techniques disclosed in the embodiments may be implemented in other ways. Here, the embodiments of the apparatus described above are merely illustrative in nature. For example, the units may be divided by logical functions, and additional division modes may be adopted in practical implementation. For example, multiple units or components may be combined or integrated into another system, or some features may be omitted or not executed. In addition, the mutual coupling, or direct coupling or communication connection illustrated or discussed may be implemented via indirect coupling or communication between some communication interfaces, units, or modules, which may be electronic, mechanical, or in other forms.

The units described as separate components may be or not be separated physically. The components illustrated as units may be or not be physical units. In other words, they may be located at one place or they may be distributed onto multiple network units. Some or all of the units may be selected as actually required to fulfill the purposes of the solutions of the embodiments.

Besides, the individual functional units in the embodiments may be integrated into one processing unit, or each of the units may be physically stand-alone, or two or more of the units may be integrated into one unit. The integrated unit described above may be implemented in a form of hardware or implemented in a form of a software functional unit.

When implemented in the form of a software functional unit and sold or used as an independent product, the integrated unit may be stored in a computer-readable storage medium. Based on such understanding, a technical solution of the embodiment essentially, or the part thereof contributing to the prior art, or the entirety or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the embodiments. The preceding storage medium includes any medium that can store program codes, such as a USB flash disk, a read-only memory (ROM), a random access memory (RAM), a mobile hard disk, a magnetic disk, or an optical disk.

The above description is merely illustrative of preferred embodiments of the present disclosure. It should be noted that several improvements and modifications can be made by those of ordinary skill in the art without departing from the principles of the present disclosure. Such improvements and modifications are also intended to be encompassed within the scope of protection of the present disclosure.

INDUSTRIAL APPLICABILITY

In this embodiment, a spray coefficient of an operating device at an operation location corresponding to a sampling point is acquired, where the spray coefficient is used for representing an amount of a chemical sprayed from the operating device at the operation location; color information corresponding to the spray coefficient at the operation location is acquired; and the operation location and the color information corresponding to the operation location are presented. This allows the visualization of spraying of a chemical from the operating device during the operation, which enables the operator to intuitively determine the status of spray from the operating device during the operation. A place where is excessively sprayed, insufficiently sprayed, or not sprayed is intuitively visible by presenting the operation location and the color information corresponding to the operation location. In the case of excessive spraying, a dilution treatment can be performed in time to reduce agrochemical residues in a crop. In the case of missed spraying or insufficient spraying, the pilot can immediately re-plan a flight route for supplementary spray. This ensures the uniform spraying of agrochemicals on crops and the reasonable utilization of agrochemicals to increase the efficiency of spraying of agrochemicals and guarantee a good harvest for farmers, thereby solving the technical problem of low efficiency of spraying of the chemical caused by failing to determine a spray amount of the chemical applied to a specific position in a target area.

What is claimed is:

1. A method for presenting a spraying operation, comprising:
   acquiring a spray coefficient of an operating device at an operation location corresponding to a sampling point, wherein the spray coefficient is used for representing an amount of a chemical sprayed from the operating device at the operation location;
   acquiring color information corresponding to the operation location according to the spray coefficient; and
   presenting the operation location and the color information corresponding to the operation location,
   wherein the acquiring color information corresponding to the operation location according to the spray coefficient comprises,
   acquiring a target spray amount corresponding to the operation location;
   calculating a value of difference degree between the target spray amount and the spray coefficient at the operation location; and
   acquiring the color information corresponding the operation location according to the value of difference degree.

2. The method according to claim 1, wherein the acquiring the spray coefficient of the operating device at the operation location corresponding to the sampling point comprises:
   acquiring information on a spray flow rate from the operating device at the operation location and information on a moving speed of the operating device when passing through the operation location; and
   determining the spray coefficient based on the information on the spray flow rate and the information on the moving speed of the operating device, wherein the spray coefficient is directly proportional to the spray amount at the operation location.

3. The method according to claim 2, wherein the acquiring color information corresponding to the operation location according to the spray coefficient comprises:
   determining a value interval within which the spray coefficient at the operation location falls; and
   determining color information corresponding to the value interval, and using the color information corresponding to the value interval as the color information corresponding to the operation location.

4. The method according to claim 2, wherein the presenting the operation location and the color information corresponding to the operation location comprises:
   presenting, in an electronic map, a moving trail of the operating device, the operation location in the moving trail, and the color information corresponding to the operation location; and
   filling gradient colors to a moving trail between adjacent operation locations according to color information corresponding to the adjacent operation locations, and presenting the moving trail which has been filled with the gradient colors.

5. The method according to claim 2, wherein the presenting the operation location and the color information corresponding to the operation location comprises:
filling gradient colors to a moving trail of the operating device between adjacent operation locations according to color information corresponding to the adjacent operation locations.

6. The method according to claim 1, wherein the acquiring color information corresponding to the operation location according to the spray coefficient comprises:
determining a value interval within which the spray coefficient at the operation location falls; and
determining color information corresponding to the value interval, and using the color information corresponding to the value interval as the color information corresponding to the operation location.

7. The method according to claim 1, wherein the presenting the operation location and the color information corresponding to the operation location comprises:
presenting, in an electronic map, a moving trail of the operating device, the operation location in the moving trail, and the color information corresponding to the operation location; and
filling gradient colors to a moving trail between adjacent operation locations according to color information corresponding to the adjacent operation locations, and presenting the moving trail has been filled with the gradient colors.

8. The method according to claim 7, further comprising: before the filling gradient colors to a moving trail between adjacent operation locations,
judging whether spray coefficients corresponding to the adjacent operation locations fall within the same value interval,
wherein it is determined to trigger the filling gradient colors to a moving trail between adjacent operation locations, when a judgment result is NO.

9. The method according to claim 8, further comprising:
determining to fill a specified color to the moving trail between the adjacent operation locations when the judgment result is YES, wherein the specified color is a color corresponding to any one of the adjacent operation locations.

10. The method according to claim 1, wherein the presenting the oration location and the color information corresponding to the operation location comprises:
filling gradient colors to a moving trail of the operating device between adjacent operation locations according to color information corresponding to the adjacent operation locations.

11. The method according to claim 10, further comprising: before the filling gradient colors to a moving trail between adjacent operation locations,
judging whether spray coefficients corresponding to the adjacent operation locations fall within the same value interval,
wherein it is determined to trigger the filling gradient colors to a moving trail between adjacent operation locations, when a judgment result is NO.

12. The method according to claim 1, further comprising, after the presenting the operation location and the color information corresponding to the operation location, sending a control instruction to the operating device, wherein the control instruction is used for controlling the operating device to perform at least one of following operations:
controlling the operating device to supplementarily spray the chemical at an operation location corresponding to a first color when the color information is the first color; and
controlling the operating device to spray water for diluting at an operation location corresponding to a second color when the color information is the second color.

13. The method according to claim 12, further comprising, before sending a control instruction to the operating device, acquiring a prescription map of a target area, wherein the prescription map is used for
representing a target spray amount at each operation location in the target area;
comparing the target spray amount with a spray amount corresponding to the spray coefficient; and
determining the control instruction according to a comparison result.

14. The method according to claim 1, further comprising, after the presenting the operation location and the color information corresponding to the operation location, sending a control instruction to the operating device, wherein the control instruction is used for controlling the operating device to perform at least one of following operations:
controlling the operating device to supplementarily spray the chemical at an operation location with a spray coefficient lower than a first preset threshold; and
controlling the operating device to spray water for diluting at an operation location with a spray coefficient higher than a second preset threshold, wherein the second preset threshold is not less than the first preset threshold.

15. The method according to claim 1, wherein the acquiring the color information corresponding to the operation location according to the value of difference degree comprises:
determining a value interval within which the value of difference degree falls; and
determining color information corresponding to the value interval, and using the color information corresponding to the value interval as the color information corresponding to the operation location.

16. The method according to claim 1, wherein the acquiring a target spray amount corresponding to the operation location comprises:
acquiring a prescription map of a site to be sprayed, wherein the prescription map is used for indicating a target spray amount which is to be sprayed onto each point or each area in the site to be sprayed; and
determining the target spray amount corresponding to the operation location according to the correspondence relationship between the operation location and a point or area on the prescription map.

17. A method for presenting a spraying operation, comprising:
acquiring a spray coefficient of an operating device at an operation location corresponding to a sampling point, wherein the spray coefficient is used for representing an amount of a chemical sprayed from the operating device at the operation location;
acquiring an element corresponding to the operation location according to the spray coefficient, wherein the element is an element in a presentation interface;
determining information on a change trend between adjacent elements; and
presenting the operation location, the element corresponding to the operation location, and the information on the change trend, wherein the acquiring the element corresponding to the operation location according to the spray coefficient comprises:

acquiring a target spray amount corresponding to the operation location;

calculating a value of difference degree between the target spray amount and the spray coefficient at the operation location; and acquiring the element corresponding to the operation location according to the value of difference degree.

18. A method for presenting operation information, comprising:

acquiring an operation coefficient of an operating device at an operation location corresponding to a sampling point, wherein the operation coefficient is used for representing an amount of operation of the operating device at the operation location;

acquiring marking information corresponding to the operation location according to the operation coefficient; and presenting the operation location and the marking information corresponding to the operation location, wherein the acquiring marking information corresponding to the operation location according to the operation coefficient comprises:

acquiring a target amount of operation corresponding to the operation location;

calculating a value of difference degree between the target amount of operation and the operation coefficient at the operation location; and acquiring the marking information corresponding to the operation location according to the value of difference degree.

19. The method according to claim 18, wherein the operation coefficient comprises at least one of: a chemical spraying operation coefficient and a coefficient for an operation of spreading of a solid object to be spread; and the marking information comprises at least one of: three-dimensional height information, fringe density information, color information, and point set density information.

* * * * *